United States Patent
Hires

(10) Patent No.: US 11,457,411 B1
(45) Date of Patent: Sep. 27, 2022

(54) SENSOR CONNECTED TO A HUMAN INTERFACE DEVICE

(71) Applicant: George Hires, Chandler, AZ (US)

(72) Inventor: George Hires, Chandler, AZ (US)

(*) Notice: Subject to any disclaimer, the term of this patent is extended or adjusted under 35 U.S.C. 154(b) by 278 days.

(21) Appl. No.: 16/792,655

(22) Filed: Feb. 17, 2020

Related U.S. Application Data

(63) Continuation-in-part of application No. 16/701,651, filed on Dec. 3, 2019, now abandoned, which is a continuation of application No. 16/522,882, filed on Jul. 26, 2019, now abandoned, which is a continuation-in-part of application No. 15/433,348, filed on Feb. 15, 2017, now Pat. No. 10,615,618.

(60) Provisional application No. 62/703,940, filed on Jul. 27, 2018, provisional application No. 62/338,083, filed on May 18, 2016.

(51) Int. Cl.
| | |
|---|---|
| G06F 3/16 | (2006.01) |
| H04W 52/02 | (2009.01) |
| G06F 3/03 | (2006.01) |
| H04L 12/28 | (2006.01) |
| G06F 3/04886 | (2022.01) |
| G06F 3/0488 | (2022.01) |

(52) U.S. Cl.
CPC .......... *H04W 52/0235* (2013.01); *G06F 3/03* (2013.01); *G06F 3/0488* (2013.01); *G06F 3/04886* (2013.01); *G06F 3/16* (2013.01); *H04L 12/282* (2013.01); *H04L 2012/2841* (2013.01)

(58) Field of Classification Search
CPC .... G06F 1/1601; G06F 1/1613; G06F 1/1637; G06F 2200/1613; G06F 3/0393; G06F 3/041; H02J 7/0044

USPC ............... 455/41.1, 41.2, 404.2; 370/338; 340/5.24, 5.25, 539.13; 345/158, 159

See application file for complete search history.

(56) References Cited

U.S. PATENT DOCUMENTS

| | | | | |
|---|---|---|---|---|
| 4,707,803 | A * | 11/1987 | Anthony, Jr. ......... | G06F 13/105 703/25 |
| 5,497,339 | A * | 3/1996 | Bernard ................ | G06F 1/1626 703/25 |
| 9,479,630 | B1 * | 10/2016 | Chowdhury ...... | H04M 1/72403 |
| 2004/0090424 | A1 * | 5/2004 | Hurley ..................... | G09G 5/00 345/169 |
| 2004/0192207 | A1 * | 9/2004 | Ketola .............. | H04W 52/0235 455/41.2 |
| 2005/0136886 | A1 * | 6/2005 | Aarnio .................... | H04L 12/66 455/404.2 |
| 2011/0222516 | A1 * | 9/2011 | Kurose ............. | H04M 1/72412 370/338 |
| 2013/0315038 | A1 * | 11/2013 | Ferren ................... | G06F 3/0485 367/197 |
| 2014/0197948 | A1 * | 7/2014 | Mo ........................ | H04W 64/00 340/539.13 |

(Continued)

*Primary Examiner* — Tan H Trinh
(74) *Attorney, Agent, or Firm* — Adam R. Stephenson, Ltd

(57) ABSTRACT

An apparatus includes an interface, a communication device and a processor. The interface may be configured to detect an input. The communication device may be configured to establish a connection with a user device and send an activation signal to the user device. The processor may be configured to emulate an input device compatible with the user device, receive the input from the interface and generate the activation signal in response to the input. The activation signal may be generated in a format compatible with the input device that causes the user device to execute a command.

20 Claims, 11 Drawing Sheets

(56) References Cited

U.S. PATENT DOCUMENTS

| | | | |
|---|---|---|---|
| 2014/0354545 A1* | 12/2014 | Liang | G06F 3/033 |
| | | | 345/158 |
| 2015/0302731 A1* | 10/2015 | Geerlings | G07C 9/00571 |
| | | | 340/5.24 |
| 2015/0302732 A1* | 10/2015 | Wright | H04N 21/42204 |
| | | | 340/5.25 |
| 2015/0348146 A1* | 12/2015 | Shanmugam | G06Q 20/3224 |
| | | | 705/71 |
| 2015/0364033 A1* | 12/2015 | Witkowski | G08C 17/02 |
| | | | 340/5.25 |
| 2016/0105644 A1* | 4/2016 | Smith | H04N 5/232411 |
| | | | 348/159 |
| 2016/0132092 A1 | 5/2016 | Joo | |
| 2016/0202127 A1* | 7/2016 | Chong | G01J 5/12 |
| | | | 374/121 |
| 2016/0209920 A1* | 7/2016 | Mastandrea | G06F 3/014 |
| 2016/0232137 A1* | 8/2016 | Liu | G06F 40/14 |
| 2016/0246328 A1* | 8/2016 | Christie, II | F16M 13/02 |
| 2016/0330227 A1 | 11/2016 | Lindquist et al. | |
| 2016/0357834 A1* | 12/2016 | May | G06F 30/398 |
| 2016/0373900 A1* | 12/2016 | Oishi | H03G 1/0088 |
| 2017/0229269 A1* | 8/2017 | Smith | H01H 47/325 |
| 2017/0230812 A1* | 8/2017 | Gehrling | G06F 3/017 |
| 2017/0313262 A1* | 11/2017 | Wisnia | H04L 65/602 |
| 2018/0109999 A1* | 4/2018 | Finnegan | H04W 52/02 |
| 2018/0300776 A1* | 10/2018 | Yost | G06Q 30/0283 |
| 2019/0182941 A1* | 6/2019 | Greene | H05B 47/185 |
| 2019/0279169 A1* | 9/2019 | Ivanovic | G06Q 10/06311 |

* cited by examiner

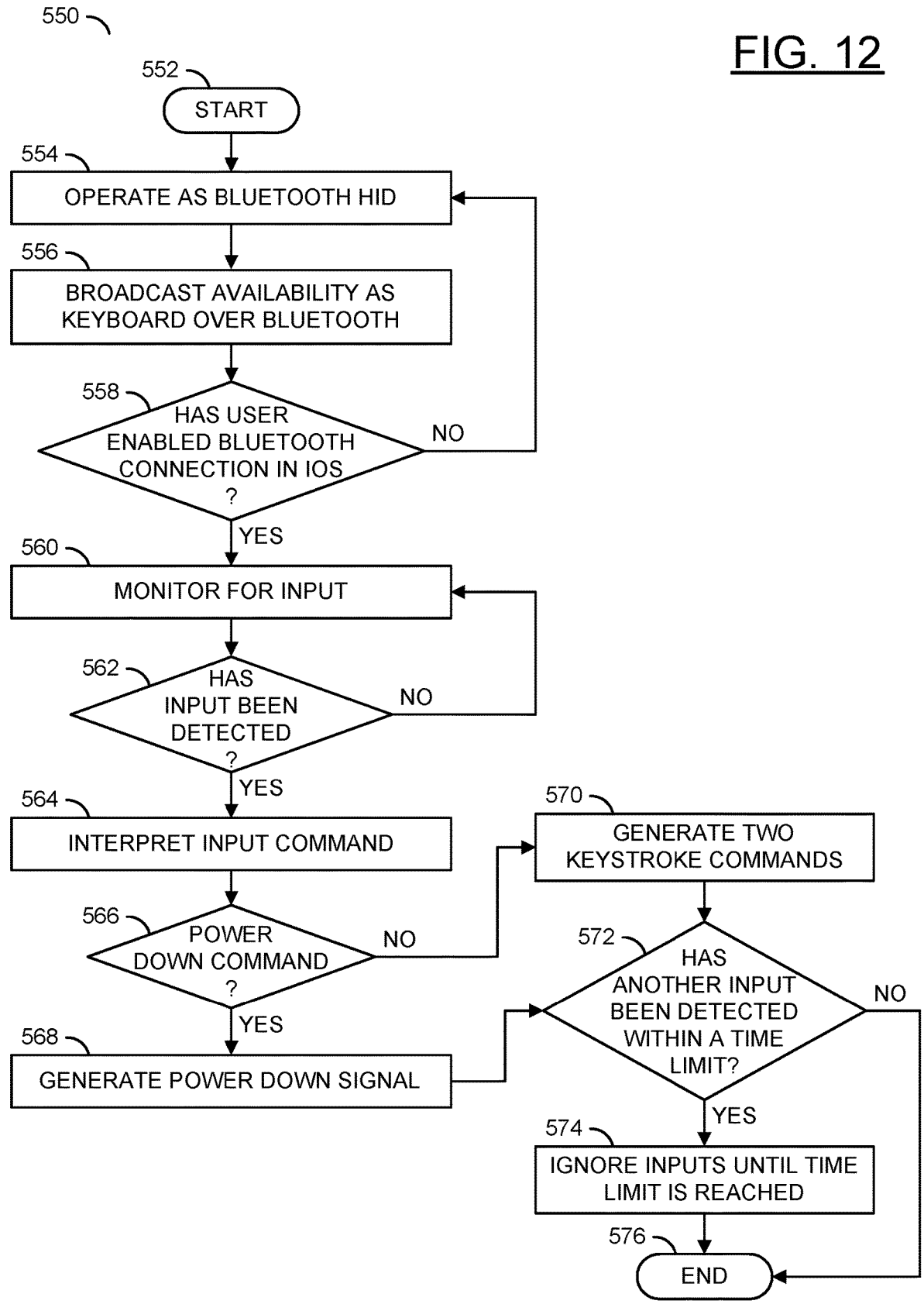

SENSOR CONNECTED TO A HUMAN INTERFACE DEVICE

This application relates to U.S. Ser. No. 16/701,651, filed Dec. 3, 2019, which relates to U.S. Ser. No. 16/522,882, filed Jul. 26, 2019, which relates to U.S. Provisional Application No. 62/703,940, filed Jul. 27, 2018, which is hereby incorporated by reference in its entirety.

This application also relates to U.S. Ser. No. 15/433,348, filed Feb. 15, 2017, which relates to U.S. Provisional Application No. 62/338,083, filed May 18, 2016, which are each incorporated by reference in their entirety.

FIELD OF THE INVENTION

The invention relates to detection devices generally and, more particularly, to a method and/or apparatus for implementing a sensor connected to a human interface device.

BACKGROUND

Portable user devices, such as tablet computers, provide a wide range of functionality. Since portable user devices are designed to conserve battery power, the touchscreen display powers down after some amount of time has passed. The wide range of functionality of portable user devices allows for creative uses outside of the expected usage scenarios. For example, a tablet computer can be mounted at a stationary location and receive power from a wire (i.e., to be used to control a home entertainment system).

Since portable user devices are not designed for stationary use and receiving a constant power supply, there are often difficulties in a stationary usage scenario. For example, the touchscreen display might automatically shut down unless a user interacts with the device, or the touchscreen display might stay on indefinitely when constant power is received and waste energy. Constantly charging while leaving a portable user device on can also cause damage to, or reduce the longevity of, the portable user device. Users do not want the inconvenience of walking up to the touchscreen display to turn the screen on and users do not want to waste energy by leaving the display turned on when nobody is around.

It would be desirable to implement a sensor connected to a human interface device.

SUMMARY

The invention concerns an apparatus comprising an interface, a communication device and a processor. The interface may be configured to detect an input. The communication device may be configured to establish a connection with a user device and send an activation signal to the user device. The processor may be configured to emulate an input device compatible with the user device, receive the input from the interface and generate the activation signal in response to the input. The activation signal may be generated in a format compatible with the input device that causes the user device to execute a command.

BRIEF DESCRIPTION OF THE FIGURES

Embodiments of the invention will be apparent from the following detailed description and the appended claims and drawings.

FIG. 12 is a flow diagram illustrating a method for communicating an activation signal in response to detecting an input.

DETAILED DESCRIPTION OF THE EMBODIMENTS

Embodiments of the present invention include providing a sensor connected to a human interface device that may (i) communicate with a portable computing device, (ii) establish a connection using a Bluetooth protocol, (iii) activate a touchscreen display in response to detecting a presence, (iv) emulate keystrokes from a keyboard, (v) be powered using a USB power connector and/or (vi) be implemented as one or more integrated circuits.

Figure 1:
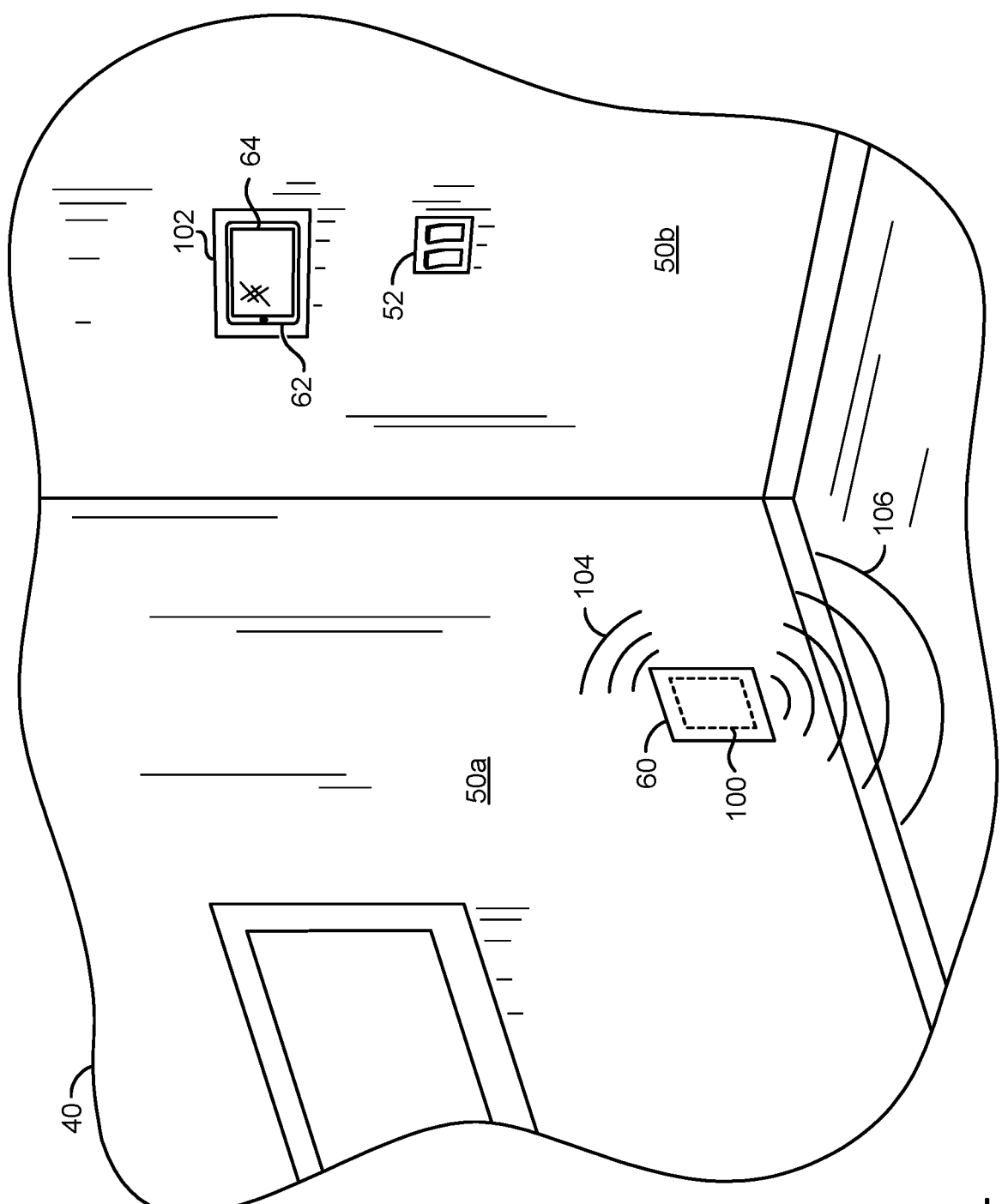
FIG. 1 is a diagram illustrating an example context of the present invention.

Referring to FIG. 1, a diagram illustrating an example context 40 of the present invention is shown. The example context 40 may be a room in a home and/or business. The portion of the room 40 is shown having a wall 50a and a wall 50b. A light switch 52 is shown on the wall 50b. A wall plate 60 is shown on the wall 50a. In one example, the wall plate 60 may be a flat, plastic cover. In another example, the wall plate 60 may be a decorative cover.

A block (or circuit, or apparatus, or device) 100 is shown. In some embodiments, the apparatus 100 may be located behind the wall plate 60. In an example, the apparatus 100 may be located within (e.g., behind drywall and between wall studs) the wall 50a. A portion of the wall 50a may be cut out (e.g., a section of drywall) to enable placement of the apparatus 100 and the wall plate 60 may be a decorative cover to hide the cut out portion of the wall 50a.

A wall-mount dock 102 is shown. The wall-mount dock 102 may enable a portable user device 62 to be mounted to the wall 50b. The portable user device 62 may be a tablet computing device (e.g., an iPad, an Android tablet, a touchscreen device, etc.). In an example, the portable user device 62 may be an iPad, an iPad mini, a Google tablet, etc. In some embodiments, the portable user device 62 may be a smartphone. In some embodiments, the portable user device 62 may be a "phablet". Generally, the front of the portable user device 62 comprises a touch-capable interface 64. The wall mount 102 may enable the touch screen interface 64 to be accessible at a desired location on the wall 50b.

A portion of the wall 50b may be cut out to enable placement of the wall mount 102. The wall mount 102 may provide a decorative cover to hide the cut out portion of the wall 50b while enabling the portable user device 62 to be mounted to the wall 50b and providing access to power connections for the portable user device 62. Details of the wall mount 102 may be described in accordance with U.S. patent application Ser. No. 14/433,348, filed Feb. 15, 2017, appropriate portions of which are hereby incorporated by reference.

The apparatus 100 is shown behind the wall 50a near the floor. The wall mount 102 is shown on the wall 50b near chest height. However, the location of the apparatus 100 and/or the wall mount 102 may be varied according to the design criteria of a particular implementation. Generally, the apparatus 100 may be located with respect to the wall mount 102 in an arrangement that enables communication between the apparatus 100 and the portable user device 62.

The apparatus 100 may be configured to communicate with the portable user device 62. In some embodiments, the apparatus 100 may communicate using a wired connection (e.g., USB, Thunderbolt, USB On-The-Go, etc.). In the example shown, a wireless communication 104 may be implemented to enable communication between the apparatus 100 and the portable user device 62. The wireless communication 104 (or a wired communication) may enable the apparatus 100 to establish a connection to the portable user device 62 and/or send an activation signal to the portable user device 62.

The apparatus 100 may be configured to receive an input 106. The apparatus 100 may be configured to generate the activation signal using the wireless communication 104 in response to the input 106. In the example shown, the input 106 may be a proximity detection (e.g., implemented using radio frequency waves). For example, when a person moves close to the wall plate 60, the proximity detection may be the input 106 for the apparatus 100. The type of input 106 received by the apparatus 100 may be varied according to the design criteria of a particular implementation. While the input 106 is shown as proximity detection (e.g., motion detection) in the example shown, the input 106 may be any type of input that may be detected by a sensor. For example, the input 106 may be a temperature reading, a voice command, an electrical connection, a wireless signal, a detection made using computer vision, etc.).

In some embodiments, the activation signal may be configured to activate the touchscreen interface 64 (e.g., display) of the portable user device 62. In an example, the portable user device 62 may be configured to control an in-home audio and/or entertainment system. For example, the portable user device 62 may run a music app to provide audio to a sound system. Without input by a user, the touchscreen interface 64 may power down after a particular amount of time (e.g., a sleep time). However, for a home entertainment system, the user may want the music app to stay powered on (e.g., to display album art for the music that is being played by the portable user device 62). The activation signal generated by the apparatus 100 may be configured to initiate a power on of the display for the touchscreen interface 64 (e.g., turn on from a sleep mode) and/or keep the touchscreen interface 64 turned on (e.g., prevent a sleep mode).

In the context of the room 40, the portable user device 62 may enter a sleep mode when the input 106 is not detected (e.g., not detected for a pre-defined amount of time such as 10 minutes) and the touchscreen display 64 may be off. When the input 106 is received (e.g., a person walks near the apparatus 100 to provide the motion input 106), the apparatus 100 may generate the activation signal. The activation signal may remotely cause the portable user device 62 to execute a command. The command may activate the touchscreen interface 64 (e.g., turn on a display and enable touchscreen input). For example, the apparatus 100 may enable the touchscreen interface 64 to be activated without physically interacting with the portable user device 62. In one example, a command provided by the activation signal may activate the touchscreen display 64 of the portable user device 62 to enable controlling audio playback (e.g., to control a music app). In some embodiments, the command may deactivate the touchscreen interface 64 (e.g., turn off a display and/or enable a sleep or hibernation state for portable user device 62).

Figure 2:
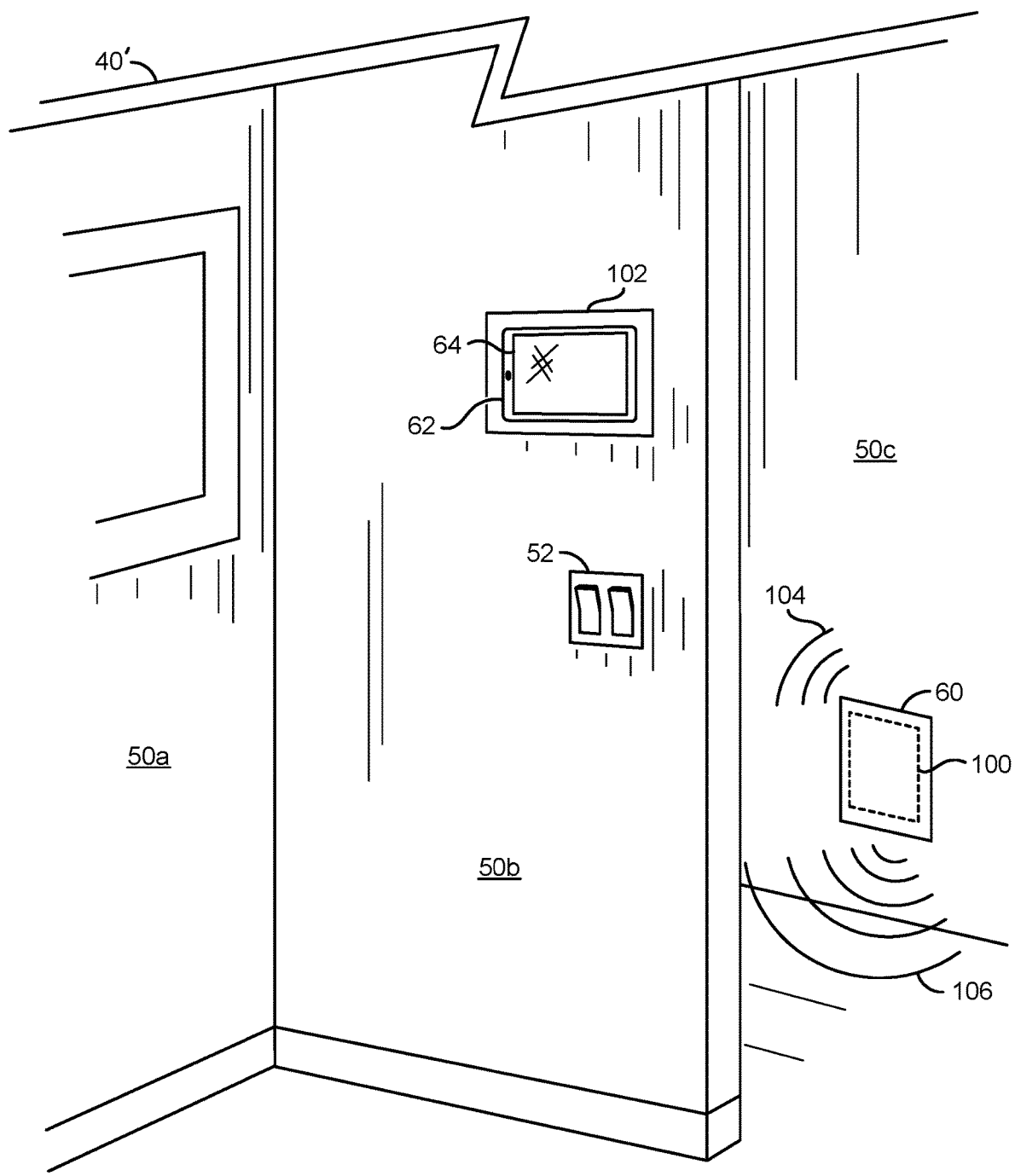
FIG. 2 is a diagram illustrating an alternate example context of the present invention.

Referring to FIG. 2, a diagram illustrating an alternate example context 40' of the present invention is shown. The wall mount 102 holding the portable user device 62 is shown on the wall 50b. A wall 50c is shown. The apparatus 100 is shown in the wall 50c and the wall plate 60 is shown covering the wall 50c. In the example shown, the apparatus 100 may be located in a hallway on another side of the wall 50b (e.g., there may be no direct line of sight between the portable user device 62 and the apparatus 100).

The wireless communication 104 may enable the established connection and/or the activation signal to communicate even when there is no direct line of sight between the portable user device 62 and the apparatus 100. The proximity detection implemented by the apparatus 100 may detect the input 106 when there is direct line of sight (e.g., a person walks in front of the wall plate 60) and/or when there is no direct line of sight (e.g., a person near the wall 50a). The arrangement of the apparatus 100 and the portable user device 62 may be varied according to the design criteria of a particular implementation.

In an example, the area 40' may be vacant (e.g., no people around). A person may have to walk by the wall 50c (e.g., though a hallway between the wall 50b and the wall 50c) to access a room bounded by the walls 50a-50b. When the room bounded by the walls 50a-50b is vacant, the touchscreen display 64 may be powered off. When a person walks down the hallway in front of the wall 50c, the nearby motion may be detected as the input 106. The apparatus 100 may generate the activation signal in response to the input 106. The apparatus 100 may present the activation signal to the portable user device 62 via the wireless connection 104. The activation signal may cause the portable user device 62 to execute a command.

The command may power on the touchscreen display interface 64. For example, when the person walks by the wall plate 60 on the way to entering the room bounded by the walls 50a-50b, the touchscreen interface 64 may be activated by the apparatus 100 (e.g., activated by the time the user enters the room). After no motion is detected for a particular amount of time (e.g., everybody leaves the room 40'), the portable user device 62 may power down the touchscreen interface 64 (e.g., to conserve power) since the apparatus 100 may no longer provide the activation signal. In another example, the command may deactivate (e.g., power off) the touchscreen display interface 64. For example, the activation signal may operate as a deactivation for the portable user device 62. The command may be configured to execute other functions for the portable user device 62 (e.g., play a particular audio track, hibernate, enable/disable a microphone for accepting voice commands, enable/disable a camera, enable a touchscreen keyboard, activate a particular app (e.g., a weather app, a stock app, etc.), adjust a brightness setting, unlock the portable user device 62, etc.). The type of command implemented may be varied according to the design criteria of a particular implementation.

Figure 3:
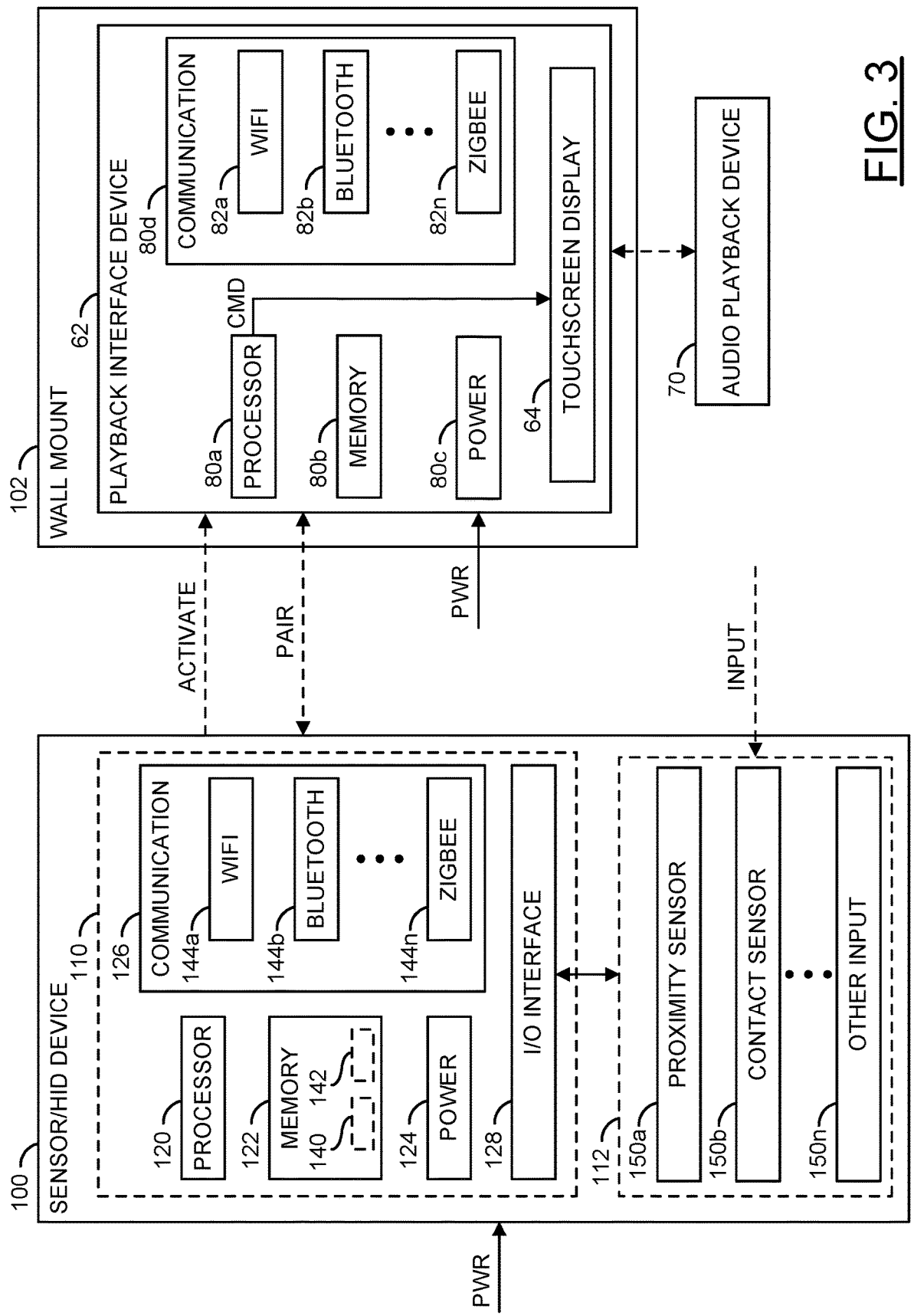
FIG. 3 is a block diagram illustrating a system implementing the apparatus.

Referring to FIG. 3, a block diagram illustrating a system implementing the apparatus 100 is shown. A block diagram of the apparatus 100 is shown. In one example, the apparatus 100 may be implemented as a proximity device. In another example, the apparatus 100 may be a sensor device. In yet another example, the apparatus 100 may be a human interface device (HID). A block diagram of the portable user device 62 is shown. For example, the portable user device 62 may implement a playback interface device (e.g., to control audio playback for a home entertainment system). The portable user device 62 is shown attached to the wall mount 102. A block (or circuit) 70 is shown. The block 70 may be an audio playback device (e.g., an audio receiver, speakers, a TV, etc.). The connection to the audio playback device 70 may be optional.

The apparatus 100 may comprise a block (or circuit) 110 and/or a block (or circuit) 112. The circuit 110 may implement a computing device. The circuit 112 may implement a sensor block. The computing device 110 may comprise a block (or circuit) 120, a block (or circuit) 122, a block (or circuit) 124, a block (or circuit) 126 and/or a block (or circuit) 128. The circuit 112 may comprise blocks (or circuits) 150a-150n. The circuit 120 may implement a processor. The circuit 122 may implement a memory. The circuit 124 may implement a power supply. The circuit 126 may implement a communication device. The circuit 128 may implement an input/output interface. The circuits 150a-150n may implement sensors and/or inputs. The apparatus 100 may comprise other components (not shown). The number, type and/or arrangement of the components of the apparatus 100 may be varied according to the design criteria of a particular implementation.

The apparatus 100 is shown receiving a signal (e.g., PWR). The signal PWR may be an external power source (e.g., A/C power or DC power). The apparatus 100 may communicate a signal (e.g., PAIR). The signal PAIR may establish a connection with the portable user device 62. In an example, the signal PAIR may establish communication using the Bluetooth protocol. The apparatus 100 may generate a signal (e.g., ACTIVATE). The signal ACTIVATE may be the activation signal generated by the apparatus 100. For example, the signal ACTIVATE and/or the signal PAIR may be the wireless communication 104 shown in association with FIGS. 1-2. The apparatus 100 is shown receiving a signal (e.g., INPUT). The signal INPUT may be the input 106 shown in association with FIGS. 1-2. The apparatus 100 may communicate other signals (not shown). The number and/or type of signals generated by the apparatus 100 may be varied according to the design criteria of a particular implementation.

The processor 120 may be configured to read and/or execute computer readable instructions. The processor 120 may be configured to receive input (e.g., the input 106 shown in association with FIGS. 1-2) from the interface 128. The processor 120 may be configured to generate the activation signal in response to the input 106.

By executing the computer readable instructions, the processor 120 may emulate an input device. For example, emulating the input device may enable the apparatus 100 to send/receive data in a format compatible with the input device (e.g., other devices, such as the portable user device 62, may see, react to and/or communicate with the apparatus 100 as if the apparatus 100 is the emulated input device).

From the perspective of the portable user device 62, the apparatus 100 may appear to be the input device. For example, the activation signal may be generated in a format implemented by the input device emulated by the apparatus 100. The processor 120 may emulate a human interface device. For example, the human interface device emulated by the processor 120 may be a Bluetooth keyboard.

While the apparatus 100 may be described generally as emulating an input device, the apparatus 100 may implement various types of operations to appear (or imitate) the input device. For example, the emulation performed by the apparatus 100 may comprise implementing a translation layer, implementing a compatibility layer, virtualization, present output according to a particular standard (e.g., an API), present output in a format according to an undocumented API, simulating logic, simulating inputs/outputs of a device, imitating inputs/outputs of a device, etc. The method of using the apparatus 100 to appear as an input device from the perspective of the portable user device 62 may comprise emulation and/or may be varied according to the design criteria of a particular implementation.

The memory 122 may store data. The memory 122 may comprise a block (or circuit) 140 and/or a block (or circuit) 142. The block 140 may be the computer readable instructions that may be executed by the processor 120. The block 142 may be other storage data. For example, the other storage data 142 may comprise pairing information about the portable user device 62.

The power supply 124 may provide power to the various components of the apparatus 100. In some embodiments, the power supply 124 may be a battery. In some embodiments, the power supply 124 may be configured to receive power from an external source. The signal PWR may be the external power source. In some embodiments, the power supply 124 may be configured to convert and/or distribute the signal PWR to the components of the apparatus 100. Generally, the apparatus 100 may operate in a hard-to-reach location (e.g., behind the wall plate 60), which may be an impractical usage scenario for a battery. In some embodiments, the signal PWR may recharge the battery and the battery may be a part of the power supply 124 configured to supply power to the components of the apparatus 100. Details of connecting the external power to the apparatus 100 may be described in association with FIG. 7.

The communication device 126 may be configured to implement one or more communication protocols. In some embodiments, the communication protocols may be a wired communication protocol (e.g., USB, SATA, PCIe, etc.). In some embodiments, the communication protocols may be a wireless communication protocol. The communication device 126 may comprise blocks (or circuits) 144a-144n. The blocks 144a-144n may implement various communication protocols. In the example shown, the block 144a may implement Wi-Fi, the block 144b may implement Bluetooth, the block 144n may implement ZigBee, etc. The number of and/or types of communication protocols implemented by the communication device 126 may be varied according to the design criteria of a particular implementation.

The communication device 126 may be configured to establish the connection with the portable user device 62. For example, the signal PAIR may periodically and/or continually communicate to maintain the communication channel. In an example, the connection may be a Bluetooth pairing. The communication device 126 may be configured to send the activation signal ACTIVATE to the portable user device 62. The activation signal ACTIVATE may be generated by the processor 120 in response to the signal INPUT and then communicated by the communication device 126.

The interface 128 may be configured to detect the signal INPUT. The interface 128 may be configured to receive information from the various sensors 150a-150n. The interface 128 may be configured to receive input according to a particular format. For example, the sensors 150a-150n may provide the signal INPUT in the format acceptable by the interface 128. One or more of the input devices 150a-150n may be connected to the interface 128. The sensors 150a-150n may comprise a standard push-button (wall mounted, remote-controlled, wired controller, pressure sensor, etc.), a light switch, a motion sensor, an output from a security system and/or home automation system, etc.

In some embodiments, the computing device 110 and the sensor block 112 may be implemented as a single device (e.g., the apparatus 100 may be a single board and/or be implemented as one component). In some embodiments, the computing device 110 may be a separate device and the sensor block 112 may connect to the computing device 110 (e.g., via the interface 128). Implementing the computing device 110 and the sensor block 112 separately may enable the components of the apparatus 100 to be installed in different locations.

The portable user device 62 may comprise the touchscreen display 64 and/or blocks (or circuits) 80a-80d. The circuit 80a may implement a processor. The circuit 80b may implement memory. The circuit 80c may implement a power supply. The circuit 80d may implement a communication device. The touchscreen display 64 and/or the components 80a-80d may be configured to implement the functionality of the portable user device 62 (e.g., run an operating system, run apps, execute commands, communicate data, etc.). The portable user device 62 may comprise other components (not shown). The number and/or type of components implemented by the portable user device 62 may be varied according to the design criteria of a particular implementation.

The processor 80a may be configured to execute commands. For example, the processor 80a may generate a command in response to the signal ACTIVATE. A signal (e.g., CMD) is shown. The signal CMD may present the command generated in response to the signal ACTIVATE. For example, the signal ACTIVATE generated by the processor 120 may be configured to cause the processor 80a to turn on (e.g., wake up) the touchscreen display 64 using the signal CMD. In the example shown, the signal CMD may be presented to the touchscreen display 64. However, the signal CMD may present the command to any of the components of the portable user device 62 and/or the command may be internal to the processor 80a.

The memory 80b may be configured to store data. In an example, the memory 80b may store information corresponding to previously connected devices. The memory 80b may store the apparatus 100 as one of the devices connected to the portable user device 62. In an example, the memory 80b may remember the apparatus 100 as a Bluetooth human interface device.

The power supply 80c may provide power to the components of the portable user device 62. In some embodiments, the power supply 80c may be configured to receive an external power source. In the example shown, the power supply 80c may receive the signal PWR. In some embodiments, the same external power source may supply the power for the apparatus 100 and the portable user device 62. In some embodiments, the apparatus 100 and the portable user device 62 may be supplied by different sources.

The communication device 80d may comprise a number of blocks (or circuits) 82a-82n. The blocks 82a-82n may implement various communication protocols. In the example shown, the block 82a may implement Wi-Fi, the block 82b may implement Bluetooth, the block 82n may implement ZigBee, etc. The communication device 80d may be configured to establish the connection (e.g., the signal PAIR) with the communication device 126 of the apparatus 100. The communication device 80d may be configured to receive the signal ACTIVATE.

The computing device 110 may implement a system on chip (SoC) board (e.g., comprising the processor 120, the memory 122, the communication device 126 and the interface 128 implemented on a small form-factor board). In an example, the computing device 110 may be an ESP32 SoC. The computer readable instructions 140 may be programmed using various programming languages (e.g., C, C++, JAVA, Python, Assembly, etc.). The computer readable instructions 140 may enable the computing device 110 to emulate the input/output of a particular input device. In one example, the computer readable instructions 140 may enable the computing device 110 to function as a Bluetooth HID (Human Interface Device). The emulated input/output by the computing device 110 may be configured to send predetermined commands based on the computer readable instructions 140 (e.g., the activation signal ACTIVATE). In some embodiments, the computer readable instructions 140 may comprise pre-defined options for commands provided by the signal ACTIVATE. In an example, the pre-defined options provided by the computer readable instructions 140 may comprise commands particular to various operating systems that may be implemented by the portable user device 62. In one example, one operating system (e.g., iOS) may power on the touchscreen display 64 in response to the signal ACTIVATE providing two spacebar keystrokes (e.g., spacebar inputs). In another example, another operating system (e.g., Android) may power on the touchscreen display 64 in response to the signal ACTIVATE providing another type of keystroke. In yet another example, if the portable user device 62 is password protected, then the signal ACTIVATE may be configured to communicate the password to unlock the portable user device 62. The type of commands communicated using the signal ACTIVATE may be varied according to the design criteria of a particular implementation.

When the apparatus 100 (or the computing device 110) is powered on, the communication device 126 may start broadcasting the apparatus 100 (e.g., using the signal PAIR) as an input device compatible with the portable user device 62. In an example, the communication device 126 may broadcast the apparatus 100 as a wireless keyboard. In one example, when the Bluetooth protocol is used to establish the connection PAIR, the apparatus 100 may be located within a 30 foot radius of the portable user device 62. For example, the portable user device 62 may be moved anywhere within the 30 foot radius and be able to connect with the apparatus 100. In another example, the wall mount 102 may be located within the 30 foot radius to enable the connection with the apparatus 100 when the portable user device 62 is mounted to the wall 50b.

The signal ACTIVATE may be generated in a format compatible with the emulated input device. In an example, the signal ACTIVATE may be generated in a format of a wireless keyboard. By implementing the signal ACTIVATE in the format compatible with the emulated input device, the portable user device 62 may respond to the activation signal ACTIVATE as if the signal ACTIVATE was provided by the input device. The activation signal ACTIVATE may cause the portable user device to execute a command. In an example, the command (e.g., the signal CMD) executed by the portable user device 62 may activate (e.g., wake up) the touchscreen display 64.

In some embodiments, the computer readable instructions 140 may be configured to generate the activation signal ACTIVATE to emulate a keystroke (e.g., input) of the emulated wireless keyboard (e.g., an input device). In one example, the emulated keystroke may be the spacebar key (e.g., the activation signal ACTIVATE may be in a format compatible with providing a spacebar keystroke from a Bluetooth keyboard (e.g., input device) to the portable user device 62). Generally, when the portable user device 62 receives a spacebar input, the touchscreen display 64 may be activated (e.g., when the touchscreen display is in a sleep mode with the touchscreen display 64 turned off). Similarly, when the touchscreen display 64 is already on, the portable user device 62 generally ignores the spacebar key input. For example, an iPad and/or an Android device (e.g., the portable user device 62) executes a command to wake up the touchscreen display 64 in response to the keyboard input emulated by the apparatus 100. The keystroke emulated by the processor 120 may be varied according to the design criteria of a particular implementation.

In some embodiments, the computer readable instructions 140 may be configured to cause the processor 120 to emulate two spacebar keystrokes. For example, if the portable user device 62 does not have a passcode set up, the first spacebar keystroke provided by the signal ACTIVATE may initiate the command CMD to wake the portable user device 62 and the second spacebar keystroke provided by the signal ACTIVATE may initiate the command CMD to unlock the portable user device 62 (e.g., display the active app such as a music app). Generally, apps executed using the portable user device 62 ignore a spacebar input unless a user is typing input (e.g., the app does not exit or shutdown if the spacebar key is provided). Since most apps ignore the spacebar key input, providing the signal ACTIVATE in a format compatible with a spacebar keystroke may cause the touchscreen display 64 to activate without interrupting the apps. For example, if the signal ACTIVATE is transmitted many times (e.g., each time movement is detected by the apparatus 100), the functions provided by apps executed by the portable computing device 62 may not be interrupted.

In some embodiments, the command signal CMD generated in response to the signal ACTIVATE unlock the portable user device 62 without stopping at a slide to unlock screen. In some embodiments, the command signal CMD generated in response to the signal ACTIVATE may interact with a Guided Access mode (e.g., in iOS) to ensure that a particular app is activated (e.g., a music app). The method of unlocking implemented using the command signal CMD may be varied according to the design criteria of a particular implementation and/or an operating system implemented by the portable user device 62.

In some embodiments, the input to the portable user device 62 emulated by the activation signal ACTIVATE may be selected to ensure that if the touchscreen display 64 is already on and unlocked, then the touchscreen display 64 remains on and functions provided by the portable user device 62 are not interrupted. In some embodiments, the processor 120 may provide a delay between successively generating the activation signal ACTIVATE (e.g., a delay between a first instance of the activation signal ACTIVATE and a next instance of the activation signal ACTIVATE). In an example, a two minute delay may be implemented. For example, the input 106 (e.g., motion) may be detected by the proximity sensor 112 and the processor 120 may generate a first instance of the signal ACTIVATE. If there is constant motion, the input 106 may still be detected. The processor 120 may wait for the delay (e.g., two minutes) before sending the second instance of the signal ACTIVATE. Implementing the delay may enable a user to type input using the touchscreen display 64 without the activation signal ACTIVATE unintentionally inserting the emulated keystrokes in response to the motion detected by the apparatus 100. The delay may be modified and/or edited by a user by modifying the computer readable instructions 140 and/or settings (e.g., configuration files) used by the computer readable instructions 140. The length of the delay may be varied according to the design criteria of a particular implementation.

Figure 4:
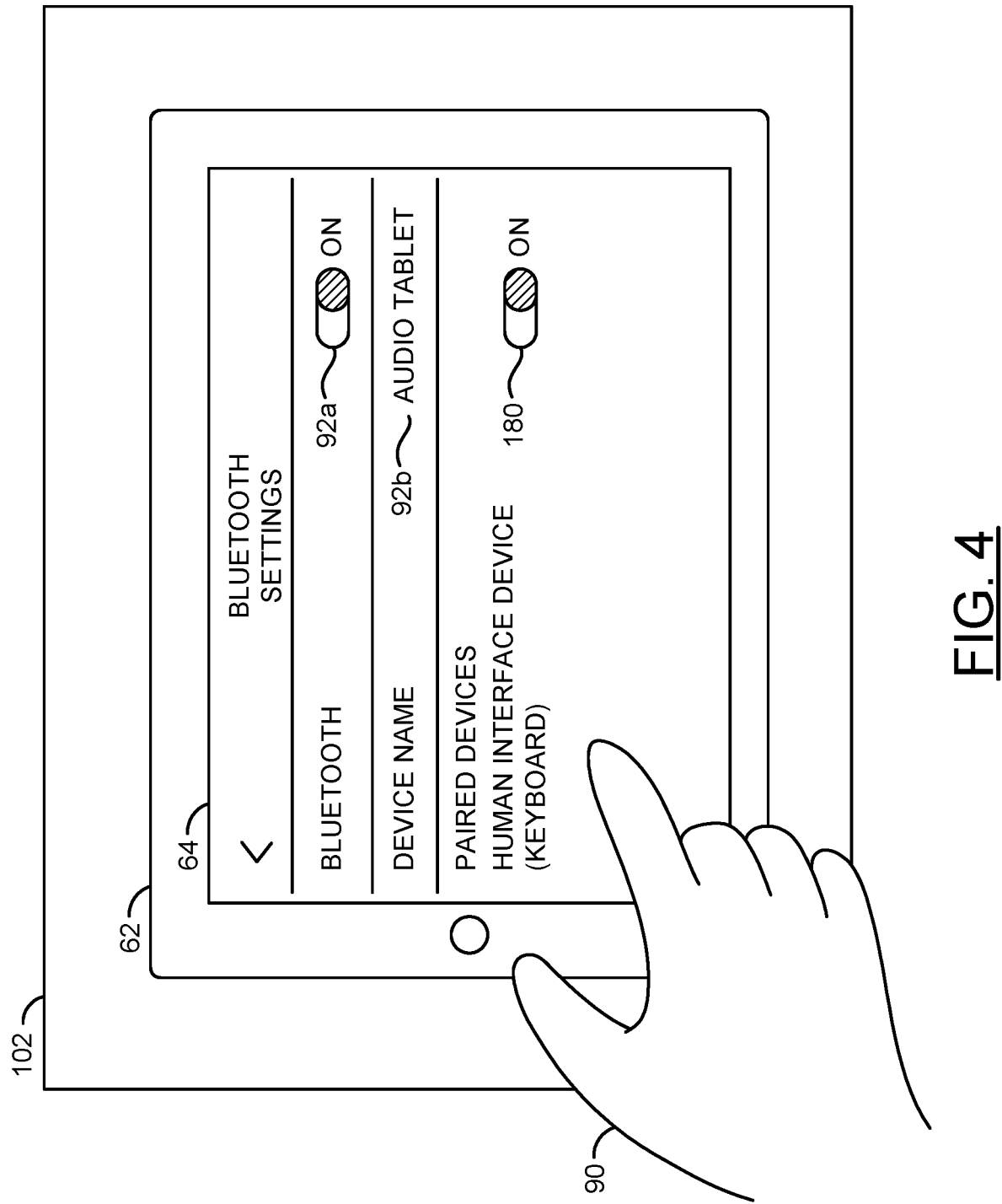
FIG. 4 is a diagram illustrating pairing the apparatus with a portable user device.

Referring to FIG. 4, a diagram illustrating pairing the apparatus 100 with the portable user device 62 is shown. The portable user device 62 is shown mounted using the wall dock 102. A user 90 is shown interacting with the portable user device 62 (e.g., touching the touchscreen display 64). In the example shown, the touchscreen display 64 is shown displaying Bluetooth connection settings (e.g., to enable the connection between the apparatus 100 and the portable user device 62). The type of settings available for connecting to the apparatus 100 may be varied according to the design criteria of a particular implementation and/or the capabilities of the portable user device 62.

A setting option 92a is shown. In the example shown, the setting option 92a may enable/disable the Bluetooth communication by the portable user device 62. A setting option 92b is shown. The setting option 92b may be a name of the portable user device 62 (e.g., the name broadcast by the portable user device 62 to other devices).

The touchscreen display 64 may display a number of devices available for connection. In the example shown, one device is shown available for connection. A setting option 180 is shown. The setting option 180 may be used to enable/disable connection with the apparatus 100. The apparatus 100 is shown on the touchscreen display 64 as a Human Interface Device (Keyboard). For example, the apparatus 100 may be configured to emulate a Bluetooth keyboard. By emulating the Bluetooth keyboard, the apparatus 100 may appear, be reacted to and/or communicated with by the portable user device 62 as the portable user device 62 would for a Bluetooth keyboard.

Initially, the user 90 may use the settings and/or options of the portable user device 62 to connect to the apparatus 100. For example, with the Bluetooth implementation, the user 90 may connect to the apparatus 100 similar to connecting to any other Bluetooth device. In an example, the user 90 may use the portable user device 62 to search for available Bluetooth devices and the apparatus 100 may be found as a Bluetooth HID. After initiating the pairing with the apparatus 100, the memory 80b of the portable user device 62 may remember the apparatus 100 as a keyboard and the apparatus 100 may be listed in the Bluetooth settings (e.g., the settings option 180). After the portable user device 62 and the apparatus 100 are paired, the portable user device 62 may respond to the keyboard commands emulated by the apparatus 100.

If the user 90 does not want the portable user device 62 to wake automatically based on the input 106 (e.g., the motion), the user 90 may enter Bluetooth settings using the touchscreen display 64 and disconnect the apparatus 100 (e.g., switch off the setting option 180). For example, for convenience, the user 90 may undock the portable computing device 62 from the wall mount 102 to type an email and disconnecting the apparatus 100 may avoid having the emulated keystrokes added in response to motion while attempting to type.

Figure 5:
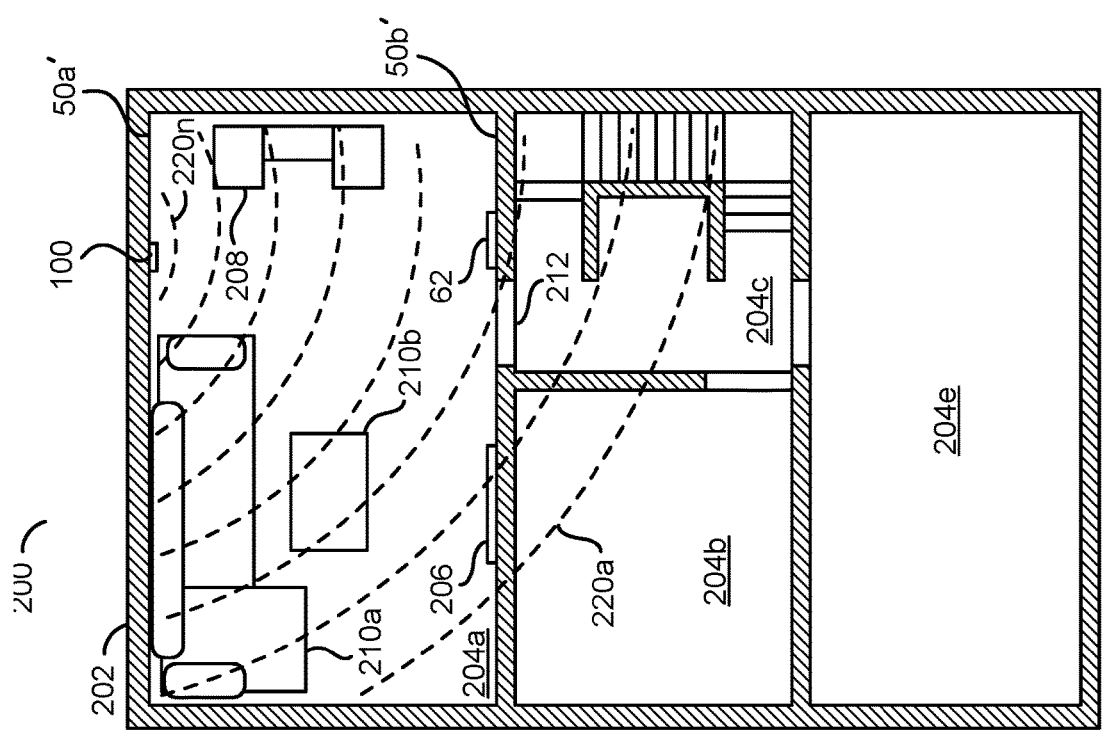
FIG. 5 is a diagram illustrating example coverage of a presence detection.

Referring to FIG. 5, a diagram illustrating an example coverage 200 of a presence detection is shown. A floor plan layout 202 is shown. The floor plan layout 202 may comprise a number of rooms 204*a*-204*e*. The apparatus 100 and the portable user device 62 are shown within the room 204*a*.

Various objects are shown within the room 204*a*. For example, a TV 206, an audio system 208 and seating 210*a*-210*b* are shown within the room 204*a*. In an example, the audio system 208 may be the audio playback device 70 shown in association with FIG. 3. A door 212 is shown at a threshold between the room 204*a* and the hallway 204*c*. The apparatus 100 is shown on the wall 50*a*' of the room 204*a*. The portable computing device 62 is shown mounted on the wall 50*b*' of the room 204*a*.

Curved lines 220*a*-220*n* are shown being emitted by the apparatus 100. The lines 220*a*-220*n* may represent signals used by the proximity sensor 150*a* to detect motion. In some embodiments, the proximity sensor 150*a* may implement a microwave radio-frequency presence detector. In one example, the lines 220-220*n* may be microwave radio frequency used to detect motion. In some embodiments, the proximity sensor 150*a* may implement an infrared presence detector. In one example, infrared light may be implemented to detect the motion.

In some embodiments, the high frequency radio frequency (RF) waves 220*a*-220*n* may be emitted by the proximity sensor 150*a*. The waves 220*a*-220*n* may represent a re-defined range of the proximity sensor 150*a*. The proximity sensor 150*a* may use the Doppler Effect to measure movements when the waves 220*a*-220*n* bounce back to the proximity sensor 150*a*. For example the waves 220*a*-220*n* may detect motion of people (e.g., the user 90) in the room 204*a*. In the example shown, the waves 220*a*-220*n* may provide omni-directional coverage of motion detection for the room 204*a* (e.g., movement in any area of the room 204*a* may be detected as the input 106). The detection of motion by the proximity sensor 150*a* within the pre-defined range of the waves 220*a*-220*n* may be the input 106 provided to the I/O interface 128.

In embodiments where the waves 220*a*-220*n* are microwave, the waves 220*a*-220*n* may go through many types of dry materials (e.g., wood, drywall, plaster, etc.). In the example coverage 200, portions of the waves 220*a*-220*c* are shown traveling through the wall 50*b*' and into the rooms 204*b*-204*c*. Since the waves 220*a*-220*n* may travel through walls, the apparatus 100 may be installed in a wall and/or tucked behind the wall mount 102.

Figure 6:
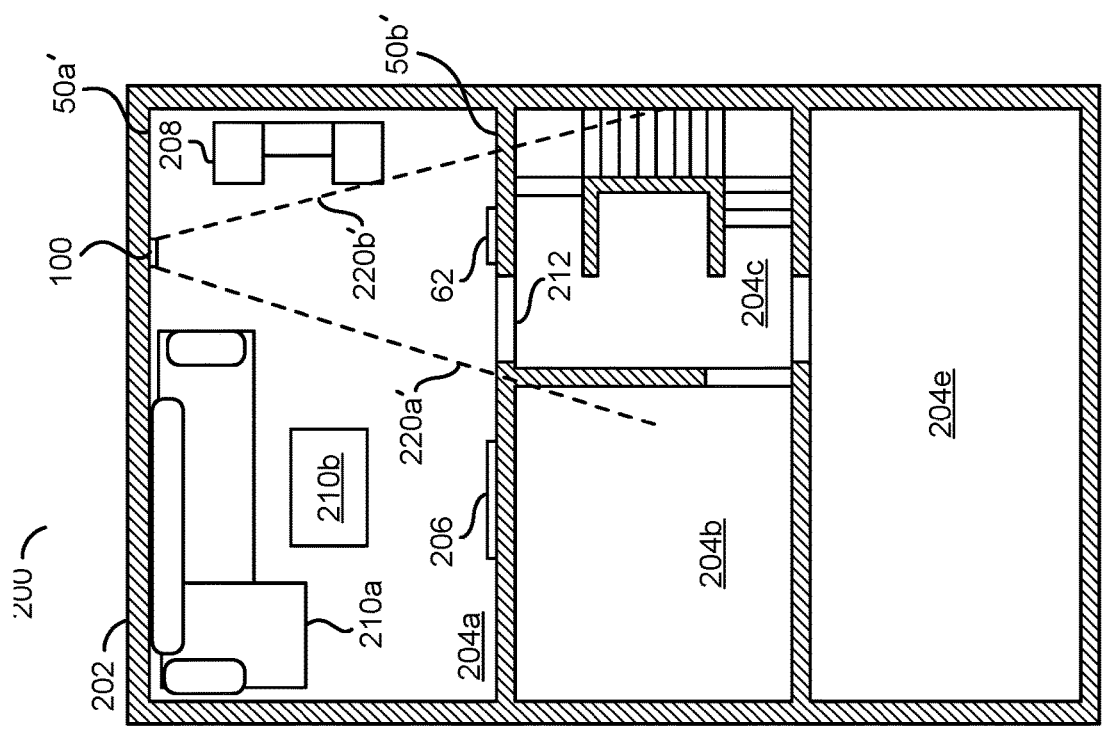
FIG. 6 is a diagram illustrating an alternate example coverage of a presence detection.

Referring to FIG. 6, a diagram illustrating an alternate example coverage 200' of a presence detection is shown. The floor plan layout 202 is shown. The floor plan layout 202 may comprise the rooms 204*a*-204*e*. The apparatus 100 and the portable user device 62 are shown within the room 204*a*.

Various objects are shown within the room 204*a*. For example, the TV 206, the audio system 208 and seating 210*a*-210*b* are shown within the room 204*a*. The door 212 is shown at a threshold between the room 204*a* and the hallway 204*c*. The apparatus 100 is shown on the wall 50*a*' of the room 204*a*. The portable computing device 62 is shown mounted on the wall 50*b*' of the room 204*a*.

Lines 220*a*'-220*b*' are shown extending from the apparatus 100. The lines 220*a*'-220*b*' may represent signals used by the proximity sensor 150*a* to detect motion. The lines 220*a*'-220*b*' may represent directional emission of the microwave radio frequency waves used to detect motion. Implementing the directional waves 220*a*'-220*b*' may enable the proximity sensor 150*a* to detect motion in a portion of the room 204*a* that is in front of the apparatus 100. For example, the proximity sensor 150*a* may comprise a potentiometer to adjust the detection sensitivity so the user 90 can dial in the detection based on the installation and/or user preference. Furthermore, the direction of the directional waves 220*a*'-220*b*' may be aimed to cover different portions of the room 204*a*.

In the example shown, the directional waves 220*a*'-220*b*' are directed towards the door 212 and extend into the hallway 204*c*. The directional waves 220*a*'-220*b*' may enable the motion detection to detect the input 106 when a person walks through the door 212 (e.g., so that the touchscreen display 64 may be activated when the person enters the room 204*a*). The directional waves 220*a*'-220*b*' may not provide coverage for motion detection in the portion of the room 204*a* having the seats 210*a*-210*b*. By not providing coverage of a portion of the room 204*a*, the touchscreen display 64 may not be activated unnecessarily (e.g., avoid false positives). Similarly, in the example coverage 200 shown in association with FIG. 5, the waves 220*a*-220*b* are shown extending through to the room 204*b* (e.g., causing potential false positives from motion in another room), which may be avoided by using the directional waves 220*a*'-220*b*'.

Figure 7:
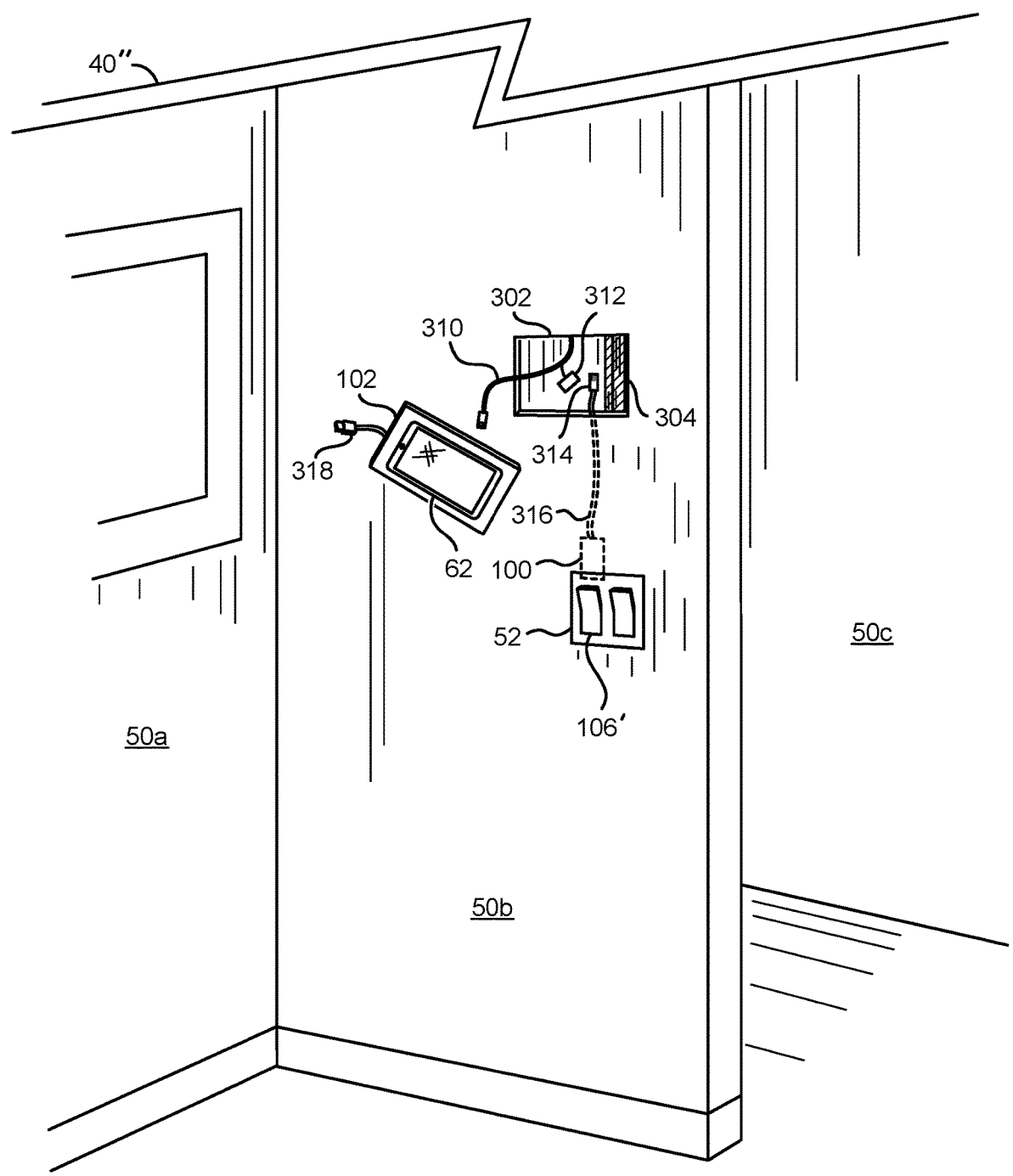
FIG. 7 is a diagram illustrating providing power to a portable user device and the apparatus.

Referring to FIG. 7, a diagram illustrating providing power to a portable user device 62 and the apparatus 100 is shown. The area 40" is shown. The walls 50*a*-50*c* are shown. A cutout 302 is shown on the wall 50*b*. The cutout 302 may be made on the wall 50*b* to enable the mounting of the wall mount 102. A wall stud 304 is shown inside the wall 50*b* in the cutout 302. In some embodiments, the wall stud 304 may be used to secure the wall mount 102. When installed, the wall mount 102 may cover the cutout 302.

In the example shown, the apparatus 100 may be installed behind the wall 50*b* near the light switch 52. In some embodiments, the sensor block 112 may comprise the contact sensor 150*b*. For example, the contact sensor 150*b* may implement screw terminals that may receive a wired signal from a contact closure input 106'. In the example shown, one of the switches of the light switch 52 may provide the input 106'. The contact sensor 150*b* may receive the input 106' by an electrical connection of the two terminals to initiate the generation of the activation signal ACTIVATE.

The cutout 302 may be used to route and/or hide wiring for the apparatus 100 and/or the portable user device 62. A wire with a connector 310 and a connector 312 is shown extending from the cutout 302. The wire with the connector 310 and the connector 312 may be connected to a power source (not shown) to supply power to the portable user device 62 and/or the apparatus 100. In an example, the wire with the connector 310 and the connector 312 may be connected to a power source of the premises. For example, the connector 310 and/or the connector 312 may be a Thunderbolt cable and/or a USB cable.

In some embodiments, the apparatus 100 may be powered by a standard USB power connector. For example, the signal PWR provided to the apparatus 100 (shown in association with FIG. 3) may be a DC power source provided by a USB cable. In the example shown, the connector 312 may connect to a connector 314 (e.g., the connector 312 and the connector 314 may implement a male and a female USB connector). A cable 316 is shown routed within the wall 50*b*. The cable 316 is shown connected to the apparatus 100. The apparatus 100 may receive power from the connector 312 via the connector 314 and the cable 316. In some embodiments, the cable 316 and/or the apparatus 100 may be plugged in behind the wall mount 102.

The connector 310 may connect to a connector 318. For example, the signal PWR provided to the portable user device 62 (shown in association with FIG. 3) may be a DC power source provided by a Thunderbolt cable. In the example shown, the connector 310 and the connector 318 may implement a male and a female Thunderbolt connector. The portable user device 62 may receive power from the connector 310 via the connector 318. In some embodiments, the connector 310 and the connector 312 may implement a dual USB charger system that may have an extra USB port behind the wall mount 102 for the purpose of providing power to the apparatus 100 and the portable user device 62.

In some embodiments, the apparatus 100 may receive the input 106 from more than one of the sensors 150a-150n. For example, one input 106 from the sensor 150a may generate the activation signal for generating the command to turn on the touchscreen display 64 and one input 106' from the sensor 150b may generate the activation signal for generating the command to turn off (or initiate a sleep mode) for the portable user device 62. In another example, one of the sensors 150a-150n may receive an input from a home automation system (e.g., a 'good-night' input received at a particular time of day) that may turn off the touchscreen display 64. The number and/or types of inputs and/or commands initiated by the activation signal may be varied according to the design criteria of a particular implementation.

Generally, the apparatus 100 may be configured to enable (e.g., wake-up) the playback interface device 62 on demand by monitoring the signal INPUT. The signal INPUT may be an input to one or more sensors 150a-150n. In the embodiments shown in FIGS. 1-2, the input monitored may be motion (e.g., the proximity sensor 150a). Other types of the sensors 150a-150n may be implemented for enabling the playback interface device 62. In one example, the signal INPUT may be received from a home automation system, a third party device (e.g., a motion sensor sold separately from the computing device 110), a pressure switch, a temperature sensor and/or a manually operated switch. The apparatus 100 may be configured to interpret the signal INPUT, determine whether the input matches a condition for enabling the playback interface device 62, and then communicating the signal ACTIVATE (e.g., a Bluetooth signal).

Activating the playback interface device 62 on demand in response to detecting and/or analyzing the signal INPUT may provide convenience and/or help prevent damage to the playback interface device 62. By activating the playback interface device 62 on demand by implementing the signal ACTIVATE, the playback interface device 62 may appear to be always on from the perspective of the end-user 90. For example, the playback interface device 62 may be active when the user 90 attempts to use the playback interface device 62 because the particular type of input has been detected by the apparatus 100. The apparatus 100 may enable the portable user device 62 to appear as an always-on kiosk to the end-user 90. However, the apparatus 100 may enable the playback interface device 62 to return to a sleep and/or low-powered state when the input is not detected (or the apparatus 100 determines that the input should be ignored). Many types of playback interface devices 62 may be damaged and/or incur a reduction in longevity when continually active and/or continually charged (e.g., on and/or charging 24 hours a day). The apparatus 100 may enable the playback interface device 62 to enter the low powered state (e.g., by not sending the signal ACTIVATE under particular conditions and/or the signal ACTIVATE sending a sleep command).

In some embodiments, one or more of the components of the apparatus 100 may be visible and/or indirectly visible (e.g., the proximity sensor 150a may be indirectly visible behind the wall plate 60). In some embodiments, the apparatus 100 may be entirely hidden from view. In the example shown in association with FIG. 7, the apparatus 100 may be hidden behind the drywall of the wall 50b. In another example, the apparatus 100 may be integrated as part of the wall mount 102.

In the examples shown, the playback interface device 62 may be a tablet computing device with the touchscreen display 64. The apparatus 100 may be configured to be compatible with other types of electronics and/or computing devices. In one example, the playback interface device 62 may be a desktop computer and/or a laptop computer. For example, the signal ACTIVATE generated by the apparatus 100 may wake up the desktop computer from a sleep/hibernate state (e.g., instead of the user 90 walking up to the mouse and/or keyboard to press a button). In another example, the signal ACTIVATE generated by the apparatus 100 may wake up a home entertainment system from an off and/or power-saving state (e.g., instead of using a remote control or a power button on a media player). The type of device that may be enabled by the apparatus 100 may be varied according to the design criteria of a particular implementation.

Figure 8:
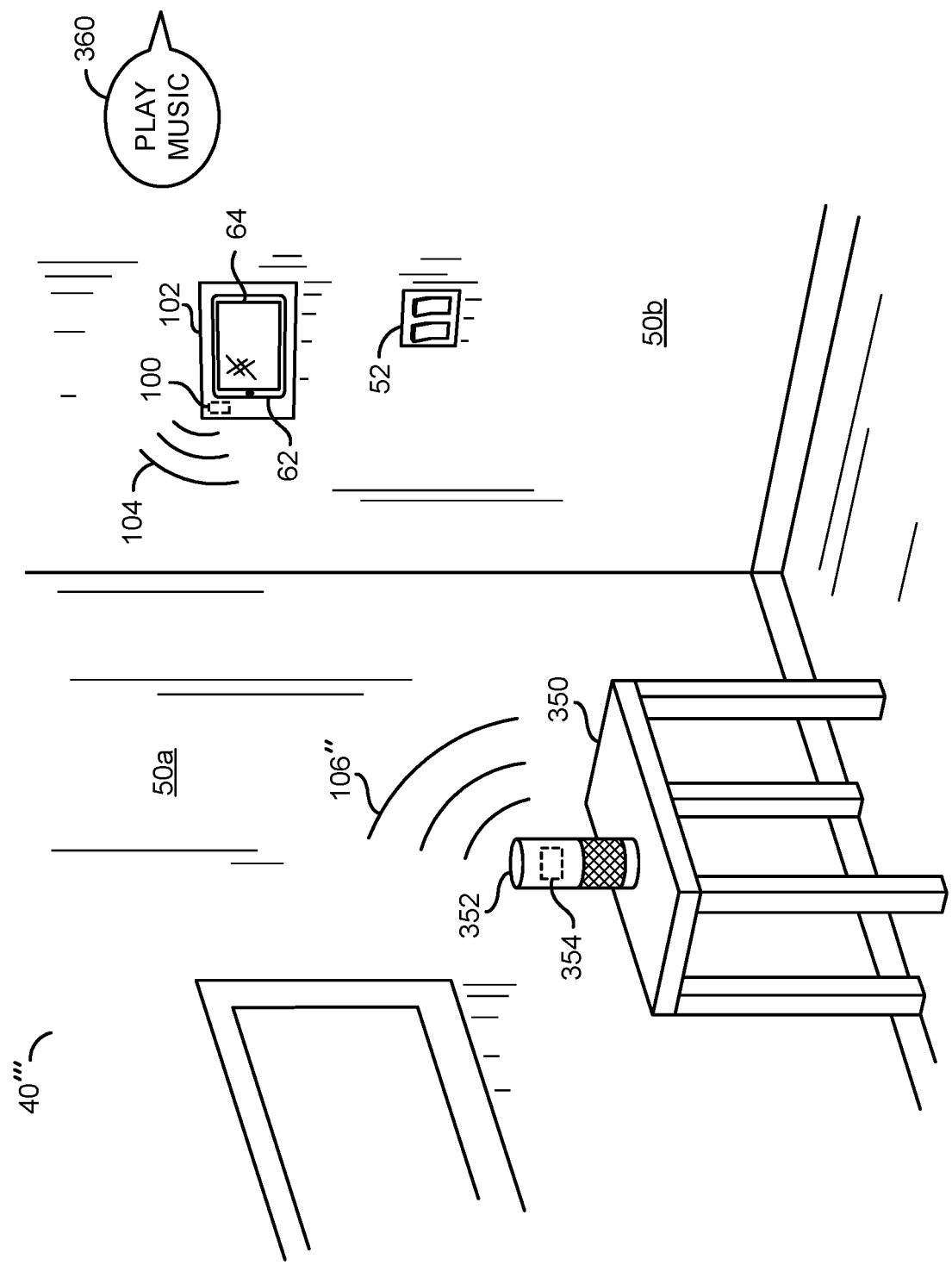
FIG. 8 is a diagram illustrating an example context of the present invention utilizing a home automation device.

Referring to FIG. 8, a diagram illustrating an example context of the present invention utilizing a home automation device is shown. The area 40''' is shown having the walls 50a-50b. The light switch 52 is shown on the wall 50b. The wall mount 102 is shown installed in the wall 50b. The portable user device 62 is shown installed in the wall mount 102. The touchscreen display 64 of the portable user device 62 is shown off.

In the example shown, the apparatus 100 may be implemented as part of the wall mount 102. In one example, the apparatus 100 may be implemented within a bezel of the wall mount 102. In another example, the apparatus 100 may be implemented within a backplate of the wall mount 102. In yet another example, the apparatus 100 may be implemented as part of a faceplate of the wall mount 102. Implementing the apparatus 100 within, or as part of, the wall mount 102 may enable the apparatus 100 to operate while hidden from view to the end-user 90. The wireless communication 104 between the apparatus 100 and the portable user device 62 may enable the apparatus 100 to be located anywhere within communication range. The end-user 90 may select a location for the apparatus 100 that may be aesthetically pleasing to the end-user 90.

A table 350 is shown in the area 40'''. A device 352 is shown on the table 350. The device 352 may be a home automation device. The home automation device 352 is shown generating the input 106''. The home automation device 352 is shown located on the table 350 next to the wall 50a near the apparatus 100 and the portable computing device 62 for illustrative purposes. Generally, the home automation device 352 may be located within range of the apparatus 100 to enable communication of the input 106''. The location of the home automation device 352 may be varied according to the design criteria of a particular implementation.

The home automation device 352 may have a native functionality. For example, the home automation device 352 may be configured to operate independent from the apparatus 100. The apparatus 100 may be configured to connect and/or interface with the home automation device 352 (wired or wirelessly). For example, the native functionality of the home automation device 352 may comprise responding to voice commands, sending requests to the internet, retrieving information from the internet, providing updates from a weather service, connecting to a cloud computing service, performing video surveillance, scheduling activation/deactivation of lights, scheduling a sprinkler system, scheduling a home heating/cooling system, streaming music, streaming video, etc. The native functionality of the home automation device 352 may be varied according to the design criteria of a particular implementation.

The home automation device 352 may comprise a block (or circuit) 354. The circuit 354 may comprise a processor, a memory, a wireless communication device, sensors, a battery, etc. The circuit 354 may enable the native functionality of the home automation device 352. The circuit 354 may enable the home automation device 352 to connect (e.g., wirelessly communicate with) the apparatus 100. For example, the circuit 354 may detect an input (e.g., a temperature), respond to the input (e.g., determine how much to adjust the heating/cooling system of the home based on the detected temperature) and generate an output (e.g., a signal for the home heating/cooling system). In some embodiments, the home automation device 352 may similarly connect and interact with the apparatus 100, and the output generated by the home automation device 352 may be communicated to the apparatus 100 as the input 106''. For example, the home automation device 352 may be used to trigger the apparatus 100 and the apparatus 100 may activate the portable computing device 62 in response to the trigger input 106'' provided by the home automation device 352.

A speech bubble 360 is shown. The speech bubble 360 may be words spoken by the end-user 90. In the example shown, the speech bubble 360 may represent the words "play music" spoken by the end-user 90.

In an example, the home automation device 352 may be configured to respond to the words 360. For example, the circuit 354 may implement voice recognition. The end-user 90 may set up the home automation device 352 to provide a particular response to the words 360 (e.g., according to the native functionality of the home automation device 352). In an example, the end-user 90 may set up the home automation device 352 to generate the input 106'' in response to the words 360 (e.g., to enable voice activation of the touchscreen display 64). The apparatus 100 may receive the input 106'' and generate the activation signal 104. The portable computing device 62 may activate the touchscreen display 64 in response to the activation signal 104.

Enabling the apparatus 100 to connect to the home automation device 352 may expand the capabilities of the apparatus 100. For example, the apparatus 100 may be implemented as a low-powered and/or low-cost device. To keep costs low, the apparatus 100 may have limited computing capabilities and/or memory (e.g., not enough resources to perform functionality such as voice recognition). The apparatus 100 may utilize the native functionality of the home automation device 352 to activate the portable computing device 62 in response to a voice command from the user 90.

Figure 9:
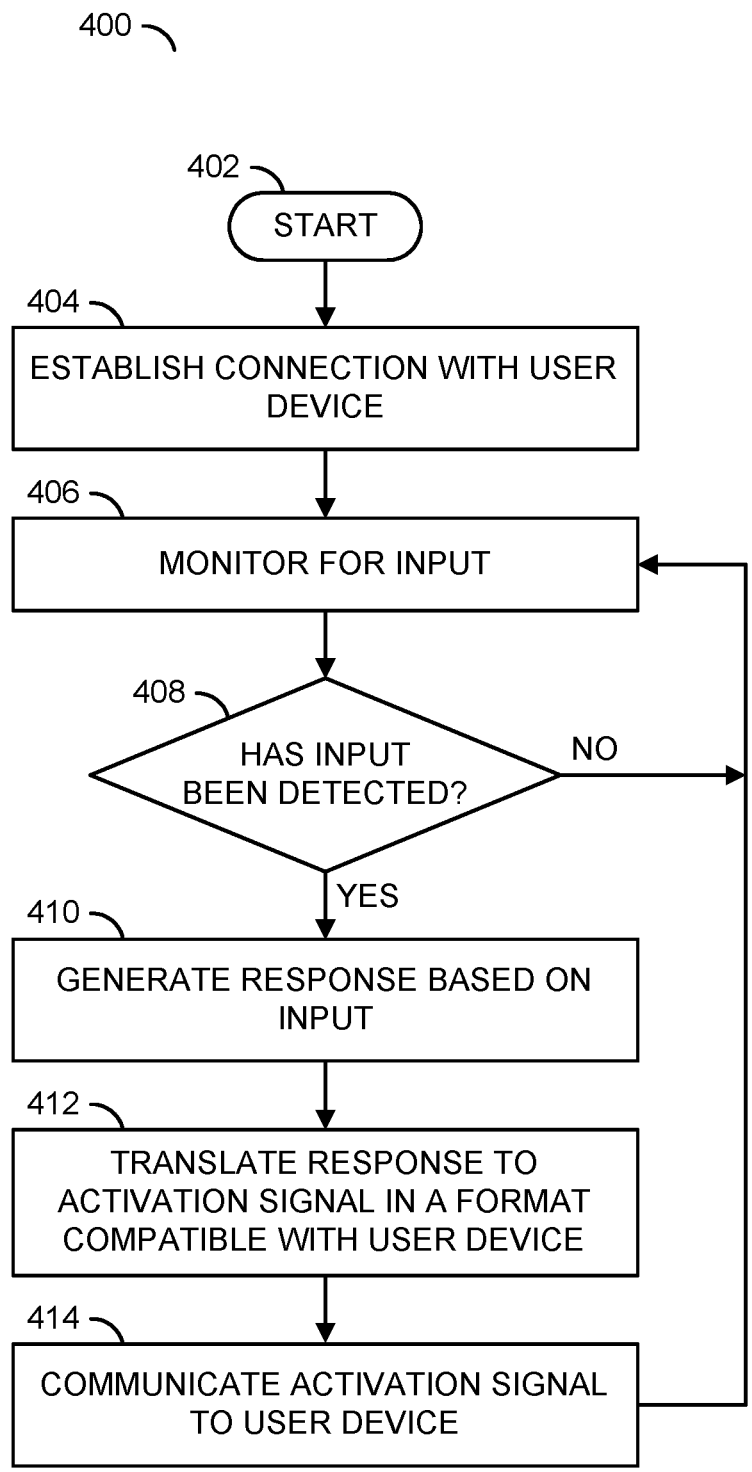
FIG. 9 is a flow diagram illustrating a method for activating a user device using a sensor connected to a human interface device.

Referring to FIG. 9, a method (or process) 400 is shown. The method 400 may activate a user device using a sensor connected to a human interface device. The method 400 generally comprises a step (or state) 402, a step (or state) 404, a step (or state) 406, a decision step (or state) 408, a step (or state) 410, a step (or state) 412, and a step (or state) 414.

The step 402 may start the method 400. In the step 404, the apparatus 100 may establish a connection with the portable user device 62. In an example, the communication device 126 of the apparatus 100 may communicate the signal PAIR with the communication device 80d of the playback interface device 62 (e.g., a Bluetooth connection). Next in the step 406, the apparatus 100 may monitor for the input 106. In an example, the processor 120 may wait for the I/O interface 128 to receive the signal INPUT from one or more of the sensors 150a-150n of the sensor block 112. Next, the method 400 may move to the decision step 408.

In the decision step 408, the processor 120 may determine whether the signal INPUT has been detected. For example, the processor 120 may monitor and/or receive data (e.g., an interrupt) from the I/O interface 128. The data from the I/O interface 128 may be the signal INPUT received from the sensor block 112. The signal INPUT may be motion detected by the proximity sensor 150a, the electrical connection in response to closing the two terminals of the contact sensor 150b, communication from the home automation device 352 (e.g., a response from the voice command 360), etc. If the signal INPUT has not been detected, then the method 400 may return to the step 406. If the signal INPUT has been detected, then the method 400 may move to the step 410.

In the step 410, the processor 120 may generate a response based on the signal INPUT. In one example, the response may be to communicate an instruction to cause the portable interface device 62 to wake up (e.g., exit a low power mode of operation and turn on the touchscreen display 64). In another example, the response may be to communicate an instruction to cause the portable interface device 62 to power down (e.g., turn off the touchscreen display 64 and enter a sleep mode of operation). Next, in the step 412, the processor 120 may execute the computer readable instructions 140 to translate the response into a format compatible with the playback interface device 62. The type of translation performed may be determined based on an operating system and/or an API implemented by the playback interface device 62. For example, the computer readable instructions 140 may comprise various types of formats for the signal ACTIVATE based on different types of devices (e.g., an iPad, an Android-based tablet, a Raspberry Pi, etc.). In the step 414, the communication device 126 may communicate the signal ACTIVATE to the playback interface device 62. Next, the method 400 may return to the step 406.

Figure 10:
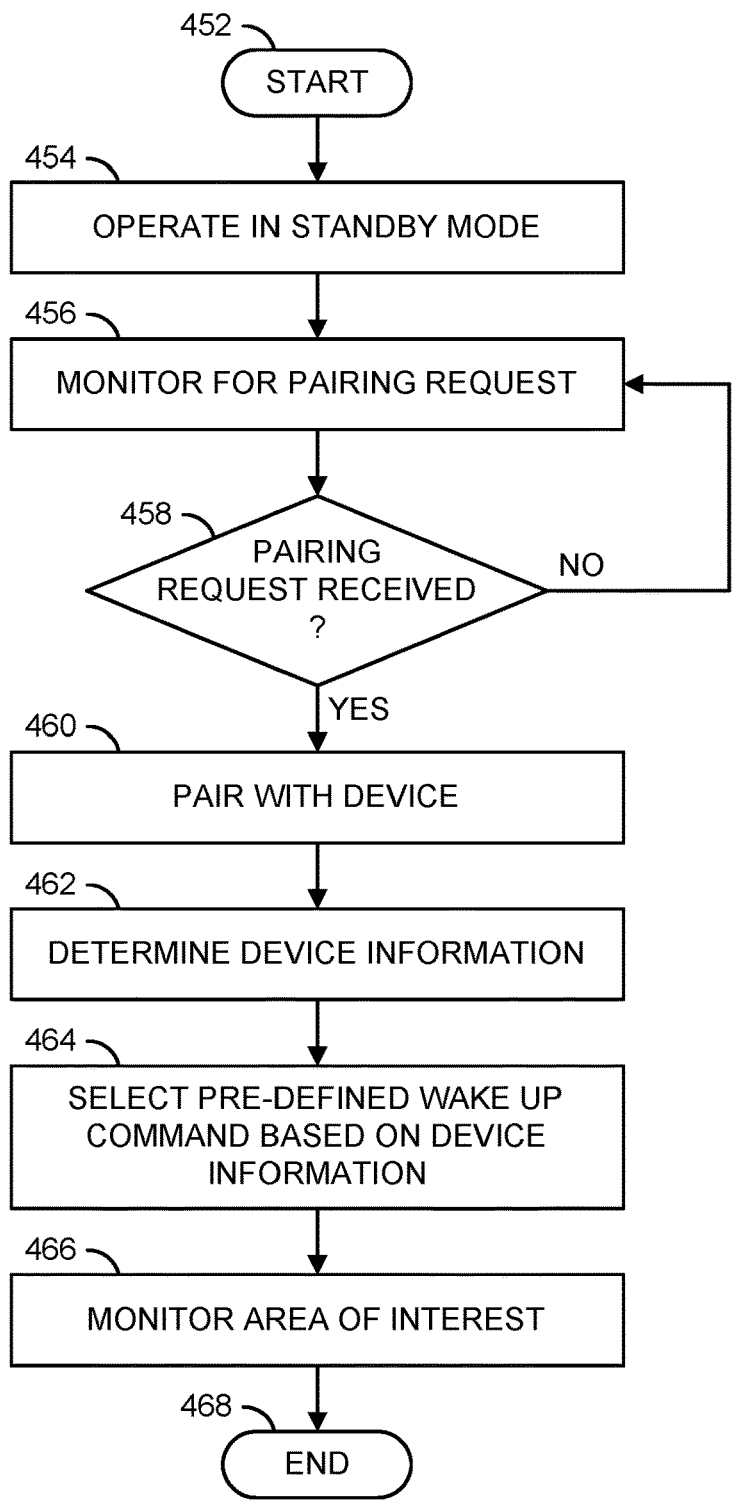
FIG. 10 is a flow diagram illustrating a method for generating a pre-defined wake up command based on a device type.

Referring to FIG. 10, a method (or process) 450 is shown. The method 450 may generate a pre-defined wake up command based on a device type. The method 450 generally comprises a step (or state) 452, a step (or state) 454, a step (or state) 456, a decision step (or state) 458, a step (or state) 460, a step (or state) 462, a step (or state) 464, a step (or state) 466, and a step (or state) 468.

The step 452 may start the method 450. In the step 454, the apparatus 100 may operate in a standby mode of operation. The standby mode of operation may be a low power state. For example, in the low power state, the apparatus 100 may conserve power and/or power down the sensor block 112 (e.g., without having a connection to the portable computing device 62 yet, the apparatus 100 may not need to monitor for the signal INPUT). Next, in the step 456, the communication device 126 may monitor for a pairing request with the playback interface device 62. For example, the computing device 110 may attempt to establish the signal PAIR between the apparatus 100 and the playback interface device 62. Next, the method 450 may move to the decision step 458.

In the decision step 458, the communication device 126 may determine whether the pairing request has been received. For example, the Bluetooth module 144b and the Bluetooth module 82b may perform operations according to the Bluetooth specification in order to establish a connection to pair the apparatus 100 and the playback interface device 62. One of the apparatus 100, the playback interface device 62 or both may initiate a pairing request. If the pairing request has not been received, then the method 450 may return to the step 456. If the pairing request has been received, then the method 450 may move to the step 460.

In the step 460, the apparatus 100 may pair with the playback interface device 62. For example, the signal PAIR may be communicated between the apparatus 100 and the playback interface device 62 in accordance with the communication protocol implemented. Next, in the step 462, the apparatus 100 may determine information about the playback interface device 62. For example, the apparatus 100 may request a device identification from the playback interface device 62 that may comprise data about an operating system installed and/or available APIs. In the step 464, the processor 120 may execute the computer readable instructions 140 to select the pre-defined wake up command for the particular playback interface device 62 based on the device information. Next, in the step 466, the apparatus 100 (or the various sensors 150a-150n, the home automation device 352, etc.) may monitor an area of interest for the signal INPUT. Next, the method 450 may move to the step 468. The step 468 may end the method 450.

Figure 11:
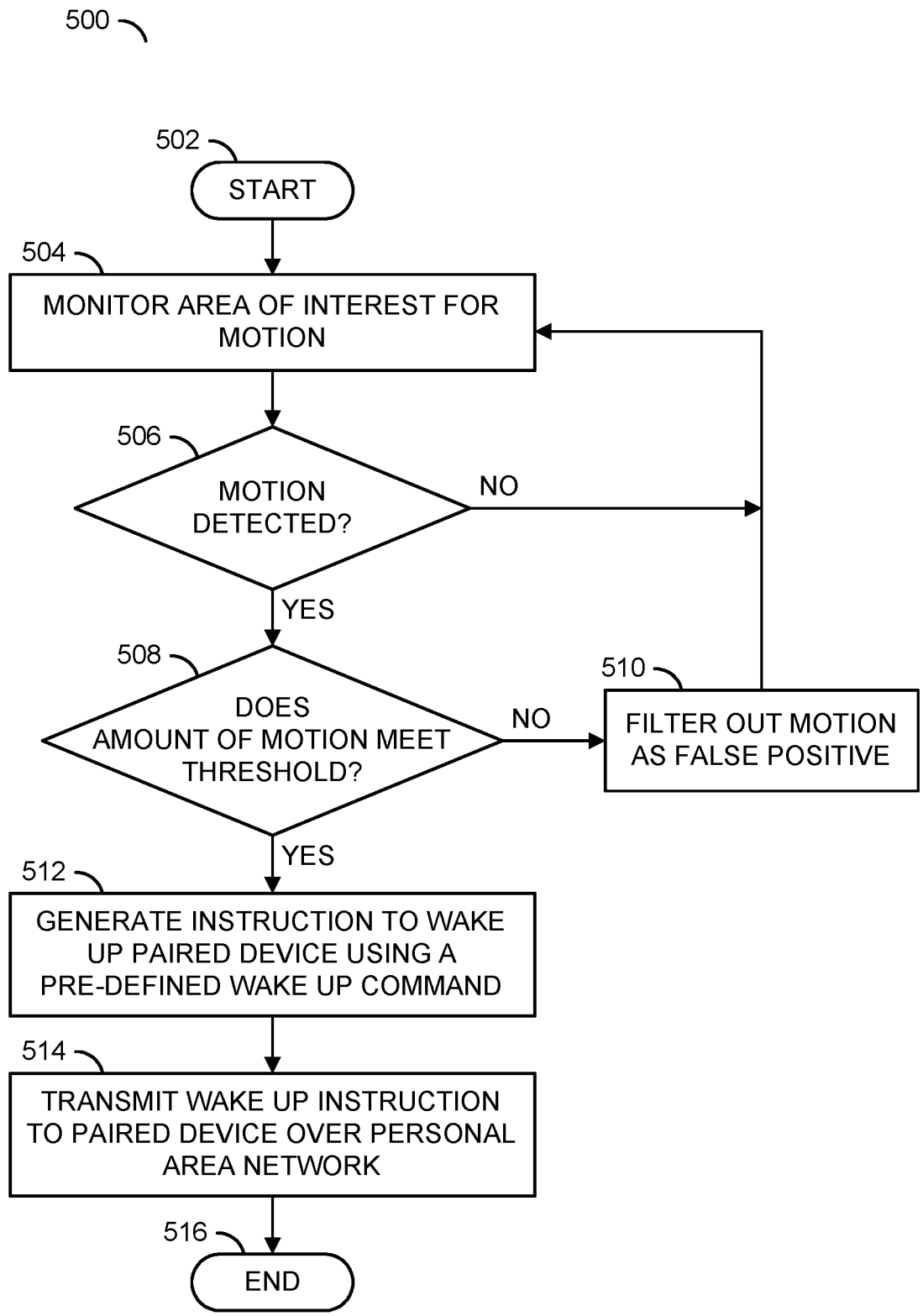
FIG. 11 is a flow diagram illustrating a method for activating a remote device using a wake up signal in response to a detected motion input.

Referring to FIG. 11, a method (or process) 500 is shown. The method 500 may activate a remote device using a wake up signal in response to a detected motion input. The method 500 generally comprises a step (or state) 502, a step (or state) 504, a decision step (or state) 506, a decision step (or state) 508, a step (or state) 510, a step (or state) 512, a step (or state) 514, and a step (or state) 516.

The step 502 may start the method 500. In the step 504, the apparatus 100 may monitor an area of interest for motion. For example, the apparatus 100 may implement the proximity sensor 150a to detect the input 106. Next, the method 500 may move to the decision step 506.

In the decision step 506, the proximity sensor 150a may determine whether motion has been detected. For example, the proximity sensor 150b may be configured to detect motion within a pre-defined range (e.g., the curved lines 220a-220n shown in association with FIG. 5 and/or the directional waves 220a'-220b' shown in association with FIG. 6). If motion has not been detected by the proximity sensor 150a, then the method 500 may return to the step 504. If motion has been detected by the proximity sensor 150b, then the method 500 may move to the decision step 508.

In the decision step 508, the processor 120 may determine whether the amount of motion detected by the proximity sensor 150b meets a motion threshold. For example, the other storage data 142 may comprise user configuration data to enable the end-user 90 to customize various settings such as the amount of motion to detect, the range of motion detection, an amount of a time limit between detections of motion, etc. The various settings may be used by the processor 120 to determine when to generate the signal ACTIVATE in response to motion detected by the proximity sensor 150a (e.g., nearby motion). If the processor 120 determines that the amount of motion does not meet the motion threshold, then the method 500 may move to the step 510. In the step 510, the processor 120 may filter out the motion as a false positive detection. Next, the method 500 may return to the step 504.

In the decision step 508, if the processor 120 determines that the amount of motion does meet the motion threshold, then the method 500 may move to the step 512. In the step 512, the processor 120 may generate the instruction to wake up the paired playback interface device 62 using the pre-defined wake up command. Next, in the step 514, the communication device 126 may transmit the wake up instruction to the paired playback interface device 62 over a personal area network with the signal ACTIVATE. Next, the method 500 may move to the step 516. The step 516 may end the method 500.

Referring to FIG. 12, a method (or process) 550 is shown. The method 550 may communicate an activation signal in response to detecting an input. The method 550 generally comprises a step (or state) 552, a step (or state) 554, a step (or state) 556, a decision step (or state) 558, a step (or state) 560, a decision step (or state) 562, a step (or state) 564, a decision step (or state) 566, a step (or state) 568, a step (or state) 570, a decision step (or state) 572, a step (or state) 574, and a step (or state) 576.

The step 552 may start the method 550. Next, in the step 554, the apparatus 100 may operate as a Bluetooth human interface device. For example, the apparatus 100 may execute the computer readable instructions 140 to enable broadcasting information to other devices, such as the playback interface device 62, that indicates that the apparatus 100 is a Bluetooth keyboard. In the step 556, the apparatus 100 may broadcast availability as a keyboard over Bluetooth using the Bluetooth module 144b. In an example, the apparatus 100 my spoof the identity of a Bluetooth keyboard that is available to connect. Next, the method 550 may move to the decision step 558.

In the decision step 558, the Bluetooth module 144b may determine whether the user 90 has enabled the Bluetooth connection in the iOS operating system on the iPad 62. For example, the user 90 may use the Bluetooth settings shown in association with FIG. 4 to pair the human interface device keyboard using the setting option 180. If the user 90 has not enabled the Bluetooth connection, then the method 550 may return to the step 554. If the user 90 has enabled the Bluetooth connection, then the method 550 may move to the step 560. In the step 560, the sensors 150a-150n may monitor for input (e.g., the signal INPUT). Next, the method 550 may move to the decision step 562.

In the decision step 562, the processor 120 may determine whether the signal INPUT has been detected by one or more of the sensors 150a-150n. If the signal INPUT has not been detected, then the method 550 may return to the step 560. If the signal INPUT has been detected, then the method 550 may move to the step 564. In the step 564, the processor 120 may interpret the input to determine a command to send. In an example, the signal INPUT may be compared to the pre-defined commands such as a wake up command, a power down command, a play music command, etc. For example, the home automation device 352 may generate different types of input signals for the apparatus 100 based on the words detected from the spoken words 360. The processor 120 may determine different types of commands based on the different types of input. Next, the method 550 may move to the decision step 566.

In the decision step 566, the processor 120 may determine whether the signal INPUT is a power down command. If the power down command was determined, then the method 550 may move to the step 568. In the step 568, the processor 120 may generate a power down signal to be sent as the signal ACTIVATE. For example, the power down signal may cause the iPad 62 to turn off the touchscreen display 64 and/or enter a sleep mode. Next, the method 550 may move to the decision step 572.

In the decision step 566, if the power down command was not determined (e.g., a wake up input command was detected), then the method 550 may move to the step 570. In the step 570, the processor 120 may generate two keystroke commands. In an example, both of the keystrokes may be a spacebar keystroke. In an example, the first spacebar keystroke may cause the iPad 62 to wake up from a sleep state and the second spacebar keystroke may cause the iPad 62 to turn on the touchscreen display 64. Next, the method 550 may move to the decision step 572.

In the decision step 572, the processor 120 may determine whether another input has been detected by one or more of the sensors 150a-150n within a pre-determined time limit from the previous input detection. In an example, the pre-determined time limit may be two minutes from the previous input. If no input has been detected within the pre-determined time limit, then the method 550 may move to the step 576. If an input has been detected within the pre-determined time limit, then the method 550 may move to the step 574. In the step 574, the processor 120 may ignore any inputs detected until the pre-determined time limit is reached. For example, ignoring additional inputs may prevent extra unnecessary keystrokes from being sent (e.g., the touchscreen display 64 would already be on from the previous keystroke and additional keystrokes sent by the apparatus 100 may interfere with the end-user 90 typing input on the iPad 62). Next, the method 550 may move to the step 576. The step 576 may end the method 550.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to detect an input;
   a communication device configured to establish a connection with a user device and send an activation signal to the user device; and
   a processor configured to emulate an input device compatible with the user device, receive the input from the interface and generate the activation signal in response to the input, wherein the activation signal is generated in a format compatible with the input device that causes the user device to execute a command.

2. The apparatus according to claim 1, wherein the input device emulated by the processor is a keyboard and the connection is a Bluetooth connection.

3. The apparatus according to claim 2, wherein the activation signal emulates two spacebar inputs by the keyboard.

4. The apparatus according to claim 1, wherein the interface is configured to receive the input from a proximity sensor and the input comprises a detection of motion within a pre-defined range from the proximity sensor.

5. The apparatus according to claim 4, wherein the proximity sensor implements a microwave radio-frequency presence detector.

6. The apparatus according to claim 1, wherein the command is implemented by the user device to wake up the user device and unlock the user device.

7. The apparatus according to claim 6, wherein the command activates a touchscreen display of the user device for controlling audio playback.

8. The apparatus according to claim 1, wherein the user device is a tablet computer.

9. The apparatus according to claim 8, wherein the tablet computer is mounted to a wall using a wall-mount dock.

10. The apparatus according to claim 9, wherein the activation signal is configured to enable the tablet computer to activate a touchscreen display remotely in response to nearby motion.

11. The apparatus according to claim 10, wherein the activation signal is configured to be ignored by an app after the touchscreen display is activated.

12. The apparatus according to claim 1, wherein the processor is configured to provide a delay between generating the activation signal and generating a next activation signal in response to a second input.

13. The apparatus according to claim 1, wherein the interface is configured to receive the input from a contact sensor.

14. The apparatus according to claim 1, wherein the command is configured to deactivate the user device.

15. The apparatus according to claim 14, wherein the input is configured to be generated by a home automation system.

16. The apparatus according to claim 1, wherein the apparatus is configured as a sensor connected to a human interface device.

17. An apparatus comprising:
an interface configured to detect an input;
a communication device configured to establish a connection with a user device and send an activation signal to the user device; and
a processor configured to emulate a keyboard compatible with the user device, receive the input from the interface, and generate the activation signal in response to the input;
wherein the activation signal is generated in a format compatible with the input device that causes the user device to execute a command; and
wherein the activation signal emulates two spacebar inputs by the keyboard.

18. The apparatus of claim 17, wherein the input is motion and is configured to be detected by a motion sensor utilizing directional waves.

19. An apparatus comprising:
an interface configured to detect an input generated by a home automation system;
a communication device configured to establish a connection with a user device and send an activation signal to the user device; and
a processor configured to emulate a keyboard compatible with the user device, receive the input from the interface, and generate the activation signal in response to the input;
wherein the activation signal is generated in a format compatible with the input device that causes the user device to execute a command; and
wherein the activation signal emulates two spacebar inputs by the keyboard.

20. The apparatus of claim 19, wherein the input is motion and is configured to be detected by a motion sensor utilizing directional waves.

* * * * *